United States Patent [19]

Lawrence

[11] 4,290,182
[45] Sep. 22, 1981

[54] METHODS AND APPARATUS FOR MEASURING THE TEMPERATURE OF A CONTINUOUSLY MOVING STRAND OF MATERIAL

[75] Inventor: Hopeton S. Lawrence, Lawrenceville, N.J.

[73] Assignee: Western Electric Co., Inc., New York, N.Y.

[21] Appl. No.: 81,603

[22] Filed: Oct. 3, 1979

[51] Int. Cl.³ .................. B22D 11/126; G01J 5/00
[52] U.S. Cl. .............................. 29/527.4; 73/355 R;
  29/33 F; 356/429; 356/43; 356/45; 250/338; 250/340
[58] Field of Search ............... 250/340, 338; 356/429, 356/43, 45; 73/355 R; 29/33 F, 527.4

[56] References Cited

U.S. PATENT DOCUMENTS

| | | | |
|---|---|---|---|
| 2,360,995 | 10/1944 | Whitten | 73/355 R |
| 2,366,285 | 1/1945 | Percy et al. | 73/355 R |
| 2,947,171 | 8/1960 | Peltola | 73/351 |
| 2,963,910 | 12/1960 | Astheimer | 73/355 R |
| 2,991,654 | 7/1961 | Engelhard | 73/359 |
| 3,044,297 | 7/1962 | Hanken | 73/355 |
| 3,186,227 | 6/1965 | Barlow | 73/359 |
| 3,309,236 | 3/1967 | Gunji | 73/355 R X |
| 3,368,076 | 2/1968 | Clifford | 73/355 R X |
| 3,461,290 | 8/1969 | Webb | 73/355 R X |
| 3,884,075 | 5/1975 | Brandli et al. | 73/355 |
| 3,924,469 | 12/1975 | Brandli et al. | 73/355 |
| 3,973,122 | 8/1976 | Goldberg | 73/355 R |
| 4,052,615 | 10/1977 | Cho | 250/340 |

OTHER PUBLICATIONS

"Conical Mirror Pyrometer for Chemical Vapor Deposition Reactors", *IBM Technical Disclosure Bulletin*, vol. 16, No. 6, Nov. 1973.
"Lasers in Industry", Edited by S. S. Charschan, pp. 563-569.

*Primary Examiner*—Nicholas P. Godici
*Assistant Examiner*—V. K. Rising
*Attorney, Agent, or Firm*—D. J. Kirk

[57] ABSTRACT

A radiation absorbing cone (34) affixed to an infrared pyrometer (31) has a pair of lateral apertures (36—36) therein through which a continuously moving heated wire (11) passes. The cone (34) blocks stray ambient radiation while substantially eliminating any reflected radiation from the wire (11) from impinging on the pyrometer (31) to provide an accurate and repeatable measurement of the wire temperature.

10 Claims, 2 Drawing Figures

U.S. Patent  Sep. 22, 1981  4,290,182

METHODS AND APPARATUS FOR MEASURING THE TEMPERATURE OF A CONTINUOUSLY MOVING STRAND OF MATERIAL

TECHNICAL FIELD

The instant invention is related to a technique for measuring the temperature of a bare wire. In particular, the temperature of a small diameter, continuously moving, wire is measured using noncontact apparatus.

BACKGROUND OF THE INVENTION

There are a number of well known contact devices used to measure the temperature of a continuously moving filament of wire. However, when the temperature of very small diameter wire is to be measured it is preferred to use noncontact techniques to avoid damage and/or breakage of the wire. Practically, the use of radiant pyrometric techniques is the most effective noncontact means of measuring the filament temperature.

A typical apparatus using pyrometric techniques is disclosed in U.S. Pat. No. 3,924,469. That patent is directed to measuring the thermal radiation emitted from a continuously moving wire using a pyrometer. The wire passes through a cylindrical metallic body having a reflective inner surface. A rotating mirror within the cylinder alternately directs the radiation from the heated wire and the reflected radiation from the cylinder walls to the pyrometer. The difference between the wire radiation and the wall radiation is an indication of the wire temperature.

Although such pyrometric techniques work well to determine temperatures of large diameter wires, when the wires have a very small diameter (e.g., 22 gauge), problems arise. The amount of thermal radiation emitted from a small area of the wire monitored by a pyrometer (e.g., less than $\frac{1}{8}$ cm$^2$) is relatively low. Additionally, the thermal radiation which is being emitted by the wire has not been utilized fully by prior art radiation pyrometers because the radiation reflected by the surroundings as well as a stray radiation influence the value obtained by such measurements in an unpredictable manner.

Accordingly, in order to improve the accuracy of a pryometric measurement, it is known to provide radiation absorbing material behind or around the wire in the vicinity of the pyrometer detecting apparatus. Although the use of such material improves the repeatability of the temperature measurement, some radiation will be reflected from the absorbing material in an unpredictable fashion resulting in measurements that are not accurately repeatable.

Thus, there is a need for an accurately repeatable, noncontact technique for measuring the temperature of a continuously moving filament.

SUMMARY OF THE INVENTION

The foregoing, and other problems are overcome by the instant noncontact method of measuring the temperature of an article. The method comprises the steps of positioning an article within a radiation absorbing cone and measuring the thermal radiation emitted from the article with a thermal radiation measuring device positioned proximate the base of the cone to determine the temperature of the article.

Advantageously, the instant technique substantially improves the repeatability of the temperature measurement by shielding the measuring device from stray radiation as well as substantially eliminating reflected radiation from the article.

DETAILED DESCRIPTION

The instant invention is described in terms of an exemplary embodiment wherein the temperature of a moving strand of wire is measured. However, such description is for purposes of exposition and not for limitation for the present technique can be used to accurately measure the temperature of various articles.

Figure 1:
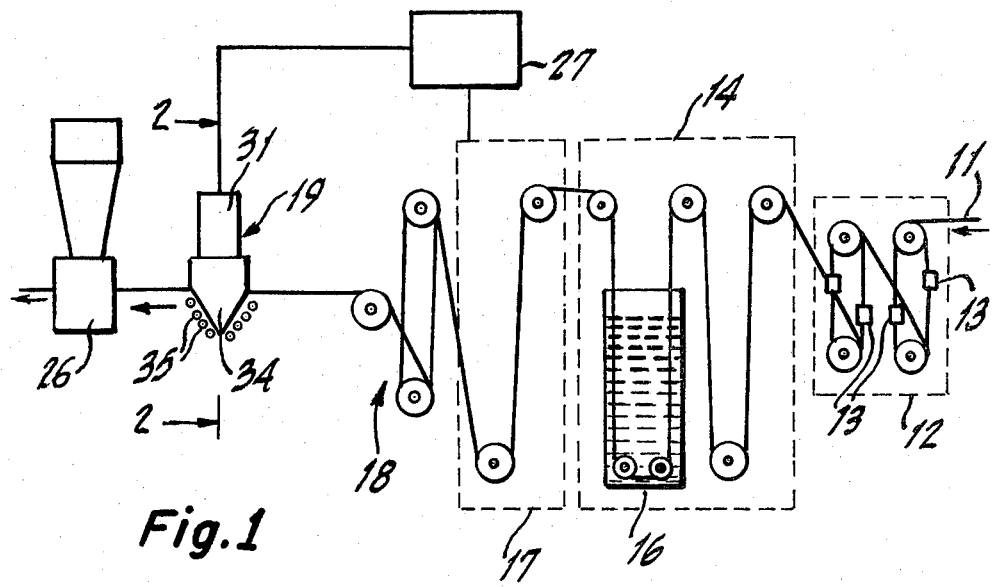
FIG. 1 is a schematic diagram of a wire extrusion coating line in which the instant invention is used.

FIG. 1 depicts a wire extrusion coating line in which the instant technique was used to continuously monitor the temperature of a moving tin plated copper wire. A large diameter tin plated copper billet or wire 11 moves into a drawing apparatus 12 and is drawn through a series of dies 13—13 which sequentially decrease the diameter thereof until the desired size (e.g., 22 gauge) is obtained. The wire 11 then passes into an annealer-quencher apparatus 14 wherein the wire is annealed at an elevated temperature (e.g., 800° F. to 900° F.) and then quenched in a water bath 16 to a temperature in the range of from 250° F. to 300° F.

The wire 11 then passes through a preheating chamber 17 which heats the wire to a temperature of about 340° F. to 370° F. The preheated wire 11 passes through a tensioner 18, a temperature measuring apparatus 19 and an extruder 26 which applies a PVC coating to the wire. A feedback control circuit 27 is connected between the temperature measuring apparatus 19 and the preheater 17.

The temperature of the wire 11 measured by the apparatus 19 is most important for the coating process that takes place in the extruder 26 requires that the temperature of the wire be within certain limits (e.g., 300° F. to 360° F.) in order to obtain an acceptable adhesion of the PVC coating on the wire.

Figure 2:
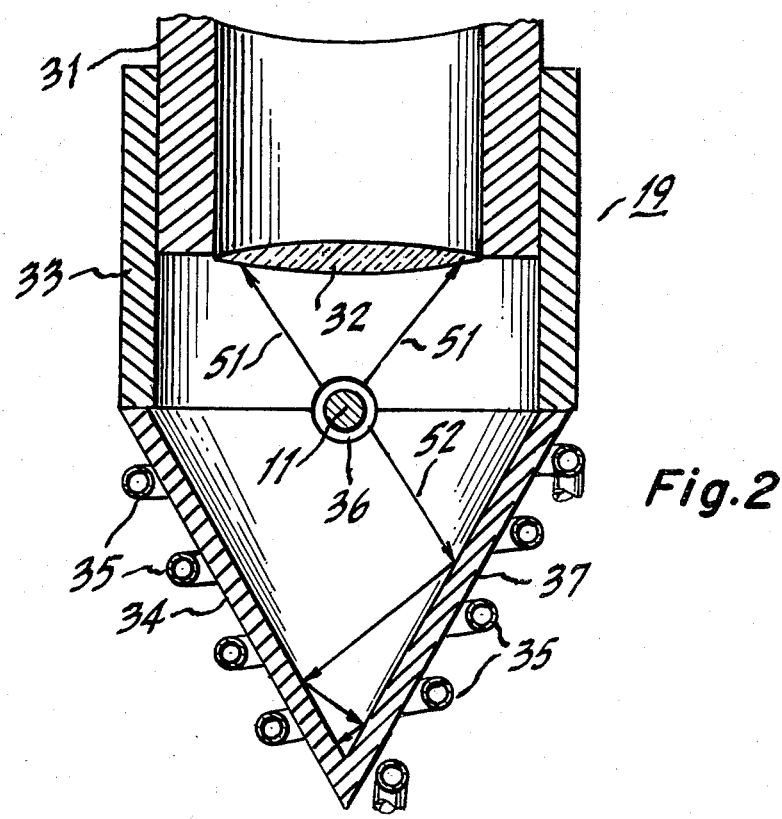
FIG. 2 is a cross-sectional view of a temperature measuring apparatus embodying the instant techniques.

FIG. 2 is a partial cross-sectional view of the exemplary temperature measuring apparatus 19. For purposes of clarity the dimensions are not to scale and have been enlarged. The apparatus 19 is comprised of a pyrometer 31 such as a model 6000 manufactured by Ircon Company which has a close focus lens 32 at one end thereof. A sleeve 33 may be mounted about the portion of the pyrometer 31 and is connected to a radiation absorbing cone 34 to form an enclosed volume therebetween. However, the cone 34 can be mounted proximate the pyrometer 31 and the sleeve 33 not used where repeatability of the temperature measurements are less critical. A pair of diametrically opposed apertures 36—36 (only one of which is seen in FIG. 2) formed at the interface of the sleeve 33 and the cone 34 permit the wire 11 to pass therethrough, the apertures having a diameter of approximately twice the wire diameter. A cooling coil 35 is mounted on the outside surface 37 of the cone 34 and operates in a well known manner to remove heat therefrom. The cone 34 may be made of aluminum, copper or the like and the inner surface thereof is comprised of heat absorbing material such as anodized black paint or the like.

In the exemplary embodiment the cone 34 had a base diameter of approximately one inch with an altitude of about 2.5 inches. Various size cones may be used to implement the instant invention depending on the size of the pyrometer, the article to be measured and the space available for the cone in the environment in which the measurement is to be made.

In operation the wire 11 is drawn through the dies 13—13 where the wire is annealed at an elevated temperature and then quenched in the bath 16 and brought back to an elevated temperature in the preheater 17. The temperature of the preheated wire 11 is monitored by the apparatus 19 and a PVC coating applied by the extruder 26. The temperature information, as determined by the apparatus 19, is presented to the feedback control circuit 27 which forwards a control signal to the preheater to adjust the temperature thereof in order to maintain the wire temperature within predetermined limits.

As noted above, infrared pyrometers 31—31 have been found to yield readings that are not accurately repeatable when a small surface area such as a 22 gauge wire is being monitored. To substantially improve the repeatability of such a measurement, the instant apparatus incorporates the radiation absorption cone 34 and the heated wire 11 passes through the lateral apertures 36—36 therein. Heat radiation from the wire 11 is emitted radially therefrom as indicated by lines 51 and 52. As can be seen, radiation from a portion of the surface nearest the pyrometer 31 will be directly detected and converted into temperature readings. However, heat radiation from the surface of the wire 11 nearest the cone 34 will be absorbed by the heat absorbing cone material and the heat removed by the cooling coils 36. Additionally, radiation line 52 clearly shows that any reflection thereof will result in the radiation moving towards the apex 53 of the cone 34. Accordingly, substantially no reflected radiation will impinge on the pyrometer 31. Furthermore, the cone 34 blocks out any stray ambient radiation and will also substantially eliminate any reflected radiation emitted from the heated wire 11 by permitting only direct rays of radiation to impinge on the pyrometer 31.

Although the exemplary embodiment describes the measuring of the temperature of continuously moving wire, it should be clear that the temperature of a variety of moving or stationary articles could be measured using the instant techniques. The cone 34 can be arranged to be detachable from the pyrometer 31 and articles positioned within the cone which then is reattached to the pyrometer and the temperature measurement made. Additionally, various modifications may be made to the instant embodiment by persons skilled in the art without departing from the spirit and scope of the invention.

What is claimed is:

1. An apparatus for measuring the temperature of a strand of material, comprising:
    a radiation absorbing cone having a pair of openings in the wall thereof through which the strand passes; and
    a thermal radiation measuring device mounted proximate the base of the cone to detect the thermal radiation emanating from the strand of material to determine the temperature thereof.

2. The apparatus as set forth in claim 1, wherein:
    the strand is a continuously moving wire.

3. The apparatus as set forth in claim 1 or 2 wherein:
    the thermal radiation measuring device is an infrared pyrometer.

4. A system for applying a coating of material to a bare wire by sequentially drawing a billet through at least one die to form the wire which then passes through a preheater and an extruder to apply the coating, the system further comprising:
    a radiation absorbing cone, interposed between the preheater and the extruder, having a pair of openings in the side thereof through which the wire passes;
    a thermal radiation measuring device mounted at the base of the cone to form an enclosed volume therebetween through which the wire passes and the thermal radiation emitted therefrom detected by the device to determine the temperature thereof; and
    a feedback control means electrically connected to the output of the thermal radiation measuring device and the preheater to control the temperature of the preheater based upon the wire temperature information from the measuring device.

5. The system as set forth in claim 4, wherein:
    the thermal radiation measuring device is an infrared pyrometer.

6. A method of measuring the temperature of an article, comprising the steps of:
    positioning an article within a radiation absorbing cone; and
    measuring the thermal radiation emitted from the article with a thermal radiation measuring device positioned proximate the base of the cone to determine the temperature of the article.

7. The method as set forth in claim 6, wherein:
    the article to be measured is a bare wire.

8. The method as set forth in claim 6, wherein:
    the thermal radiation measuring device is an infrared detector.

9. A method for applying a coating of material to a bare wire by sequentially drawing a billet through at least one die to form the wire which then passes through a preheater and an extruder to apply the coating, the method further comprises the steps of:
    interposing a radiation absorbing cone between the preheater and the extruder,
    passing the bare wire through the cone via openings in the side thereof,
    monitoring the temperature of the wire with a thermal radiation measuring device mounted at the base of the cone; and
    controlling the temperature of the preheater in response to the temperature determined by the measuring device.

10. The method as set forth in claim 9, wherein:
    the thermal radiation measuring device is an infrared pyrometer.

* * * * *